United States Patent [19]

Pekrul

[11] 3,992,065
[45] Nov. 16, 1976

[54] BRAKE CONTROL VALVE DEVICE FOR FLUID PRESSURE OPERABLE DUAL BRAKE SYSTEMS FOR MOTOR VEHICLES

[75] Inventor: Ewald H. Pekrul, Nienstedt, Germany

[73] Assignee: WABCO Westinghouse GmbH, Hannover, Germany

[22] Filed: Sept. 19, 1975

[21] Appl. No.: 614,874

[30] Foreign Application Priority Data
Sept. 25, 1974 Germany............................ 2445700

[52] U.S. Cl................................ 303/28; 137/627.5; 303/52
[51] Int. Cl.² .......................................... B60T 15/04
[58] Field of Search .............. 303/6, 52, 54, 50, 56, 303/40, 28, 30; 188/152; 137/627.5, 87, 98, 102

[56] References Cited
UNITED STATES PATENTS

| | | | |
|---|---|---|---|
| 3,198,586 | 8/1965 | Farmery et al. ....................... | 303/52 |
| 3,355,223 | 11/1967 | Klimek.................................. | 303/52 |
| 3,390,920 | 7/1968 | Dobrikin.............................. | 303/52 |
| 3,580,646 | 5/1971 | Ternent ............................... | 303/52 |
| 3,900,227 | 8/1975 | Smith et al......................... | 303/54 X |
| 3,923,346 | 12/1975 | Klimek................................. | 303/52 |

Primary Examiner—Trygve M. Blix
Assistant Examiner—Douglas C. Butler
Attorney, Agent, or Firm—R. S. Visk; R. W. McIntire, Jr.

[57] ABSTRACT

A brake control valve device for a use with tandem or tractor-trailer type vehicles employing dual brake systems with the source of operating fluid supplied at a relatively higher pressure than that required for operating the brakes. The respective valve elements of the valve device for controlling supply and exhaust of operating pressure to and from the respective brake circuits are mechanically actuated through a manually actuated pressure graduating piston (for the first brake circuit) and a fluid pressure responsive relay piston (for the second brake circuit), the dimensions of the relay piston being limited to less than normal for conserving space, but being provided with an adjusting mechanism for adjusting the fluid pressure responsive operating range thereof for compensating for the smaller dimension and synchronizing the relative serial operation of the dual brake circuits.

5 Claims, 2 Drawing Figures

FROM FLUID PRESSURE SOURCE →

TO FIRST BRAKE CIRCUIT →

FROM FLUID PRESSURE SOURCE →

TO SECOND BRAKE CIRCUIT →

BRAKE CONTROL VALVE DEVICE FOR FLUID PRESSURE OPERABLE DUAL BRAKE SYSTEMS FOR MOTOR VEHICLES

BACKGROUND OF THE INVENTION

Since modern brake systems along with other fluid pressure operable accessories employed on present day motor vehicles, particularly tandem or tractor-trailer type vehicles equipped with dual brake circuits, demand ever increasing compressed air or fluid pressure supply for operation thereof, it becomes increasingly difficult and impractical to provide a fluid pressure storage reservoir of adequate volume for accommodating such demand. A proposed solution to the problem has been to provide compressed air or fluid at a higher pressure level and thereby reduce the volume and size of the storage reservoir. Since the brake system itself, however, cannot operate at the higher level of pressure, such pressure must be limited or reduced to a degree commensurate with that required by the brake circuits.

Brake control valve devices for vehicles having dual brake circuits, in which manipulation of an operating lever or foot pedal with consequent actuation of a pressure graduating piston and a relay piston effects operation of inlet and outlet valves for respective brake circuits, are presently known. Such a valve device essentially comprises a first mechanically operable valve element for effecting supply of operating pressure to a first brake circuit and a second valve element operable in series with said first valve element, through a lost motion connection, said second valve element thereafter being controlled by a relay piston actuable responsively to operating pressure supplied to said first brake circuit. Since the relay piston (comprising two telescopically arranged concentric pistons), for the purpose of limiting the foot pedal force (upon dropping out of the first brake circuit) has to be of relatively large dimension to obtain a tolerable synchronized operation of the two brake circuits, the overall dimensions of the brake valve device itself become relatively large. Moreover, since such a device employs rubber type pads as part of the return spring arrangement, the level or degree of brake pressure supplied to the respective brake circuits is difficult to reduce or limit due to the characteristic progressive rate of compressibility of the rubber pads. Thus, the use of rubber type pads in such valve devices becomes somewhat impractical, notwithstanding that the use thereof would be desirable.

SUMMARY OF THE INVENTION

The principal object of this invention, therefore, is to provide a brake control valve device for dual fluid pressure operable brake systems and with a source of fluid at a relatively high degree of pressure, said valve device having incorporated therein means for limiting the degree of supply pressure to a lower degree commensurate to that required for the synchronization of the two brake circuits, or the leading of one circuit relative to the other with respect to application of the respective brakes, and also retaining the rubber type spring pads as part of the return spring assembly, whereby the overall dimensions of the brake valve device are kept to a minimum.

Briefly, the invention comprises a control valve device for dual brake systems having a first valve element mechanically displaceable by foot pedal pressure applied thereto in opposition to the forces of a plurality of rubber type spring pads and a plurality of steel springs acting through a pressure graduating piston for effecting supply of operating pressure to a first brake circuit, and a second valve element mechanically displaceable by a force applied thereto in opposition to a return spring acting through a relay piston assembly operable responsively to operating fluid pressure supplied by said first valve element to said first brake circuit for effecting supply of operating pressure to a second brake circuit, said relay piston assembly being limited in dimension for limiting the degree of fluid pressure supplied to said second brake circuit to a degree commensurate with the requirement thereof, and means for adjusting the compression relay piston assembly return spring for operatively synchronizing the degree of brake application of said second circuit relative to that of the first circuit, whereby the degree of application of one circuit may be higher than that of the other circuit.

BRIEF DESCRIPTION OF THE DRAWING

In the single sheet drawing.

DESCRIPTION AND OPERATION

Figure 1:
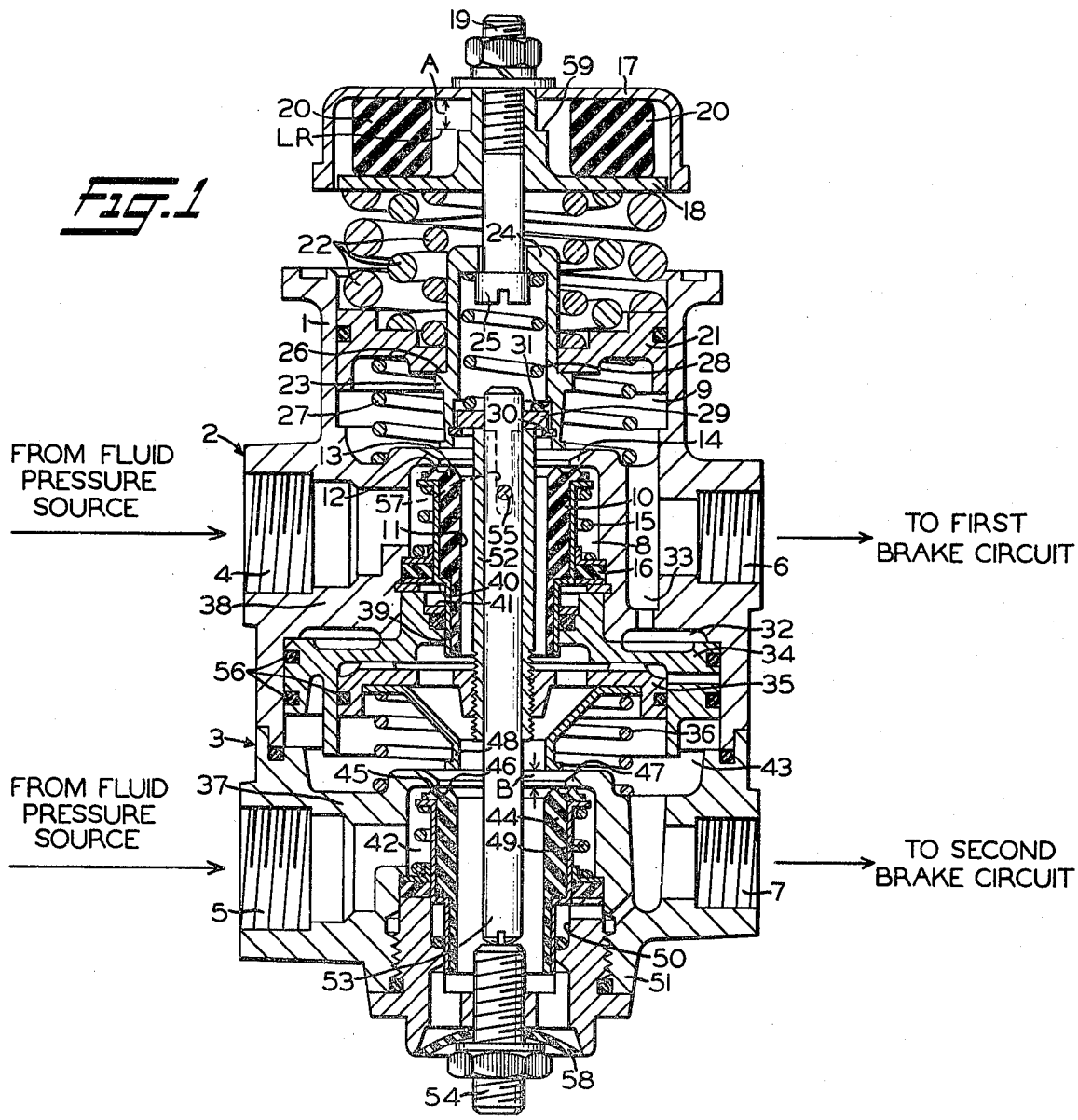
FIG. 1 is an elevational view, in section, of a dual brake circuit control valve device embodying the invention.

As shown in FIG. 1 of the drawing, the dual-circuit brake control valve device embodying the invention comprises a casing 1 housing in an upper portion thereof, as viewed in the drawing, a first brake circuit control valve portion 2, and housing in a lower portion of the casing a second brake circuit control valve portion 3. The upper and lower casing portions of casing 1 are provided with first and second fluid pressure inlets 4 and 5, respectively, which may be connected to a common source of fluid under pressure (not shown) and which are communicable, in a manner to be hereinafter disclosed, with first and second fluid pressure outlets 6 and 7 provided in said upper and lower casing portions and connected to brake cylinders (not shown), respectively, of a dual circuit brake system (not shown).

The first or upper control valve portion 2 has formed therein a first inlet or supply chamber 8 and a first outlet or delivery chamber 9 opening directly to first inlet 4 and first outlet 6, respectively. A first supply-exhaust valve member 10 is operably interposed between first supply chamber 8 and first delivery chamber 9 for controlling communication therebetween and, therefore, between first inlet 4 and first outlet 6. Valve member 10, which has a bore 11 extending coaxially therethrough, has formed at the upper end thereof, in surrounding relation to the end of said bore and in concentric relation to each other, an outer annular supply valve rib 12 and an inner exhaust valve rib 13. The outer supply valve rib 12 is so disposed as to occupy a seated or closed position, in which communication between first supply chamber 8 and first delivery chamber 9 is cut off, on a first annular valve seat 14 surrounding a central opening in a transversely disposed upper separating casing wall interposed between first supply chamber 8 and delivery chamber 9, when the brakes are in a released state, as will be more fully explained hereinafter. Valve member 10, and therefore supply valve rib 12 are biased toward the seated position on valve seat 14 by a spring 15 compressed between a flanged upper end of said valve member and a sealing ring 16 fixedly internally disposed in casing 1 in surrounding relation to said valve member for preventing leakage of fluid pressure therepast from first supply chamber 8.

A foot pedal (not shown) is operably connected to a pressure plate or cap 17 which is coaxially slidably disposed on the upper hub end (as viewed in the drawing) of a plate type spring seat 18, which, in turn, is screw-threadedly secured on a connecting bolt 19 which maintains the pressure cap and spring seat in assembled relation and also serves a further purpose to be hereinafter disclosed. A plurality of compressible pads 20, which may be of rubber material, for example, is arranged so that said pads are compressibly disposed between pressure cap 17 and spring seat 18.

A first operating or graduating piston 21 is coaxially reciprocably operable in the upper portion of casing 1. A plurality of biasing springs 22, substantially of equivalent compression rating, is compressedly interposed between spring seat 18 and a plurality of stepped shoulders formed on operating piston 21 for exerting an opposing force that is exerted thereon by foot pedal pressure. The plurality of springs 22 is provided as a safety measure. In the event that one or two of springs 22 fail, the remaining springs will provide, at least an effective degree, of opposing force. Operating piston 21 is coaxially slidably operable on a first hollow valve-operating member 23 having at its upper end a concentric collar or flange 24 by which it is coaxially slidably carried on bolt 19 above an enlarged head 25 formed on the lower end of the bolt, thus providing relative axial movement therebetween. Piston 21 also abuttingly engages an annular shoulder 26 formed on valve-operating member 23 for axially carrying said valve-operating member along therewith during downward movement of the piston. Downward movement of piston 21, and therefore of valve-operating member 23, causes said valve-operating member to sealingly engage exhaust rib valve 13 to close the exhaust valve and thereafter move supply-exhaust valve member 10 downwardly for unseating supply rib valve 12 from valve seat 14. In the absence of foot pedal pressure acting on piston 21 through springs 22, a biasing or return spring 27 compressed between the upper side of the separating wall (in which valve seat 14 is formed) and the lower side of said piston, urges said piston toward a normal position in which valve-operating member 23 may also resume a normal position out of engagement with supply-exhaust valve member 10, which, in turn, is restored by spring 15 to its seated position on valve seat 14. A caged spring 28 disposed within the hollow valve-operating member 23 is compressed between flange 24 and an annular spring seat member 29 disposed at the lower end of said valve-operating member. Relative axial movement, or lost motion, is provided between spring seat member 29 and valve-operating member 23, the amount of such lost motion being the axial distance between a retaining ring 30 secured internally at the lower end of valve-operating member 23 and a shoulder 31 formed internally of said valve-operating member less the axial thickness of said spring seat member.

The second brake circuit control valve portion 3 comprises a relay chamber 32 connected via a passageway 33 to first delivery chamber 9, so that any fluid pressure prevailing in said delivery chamber also prevails in said relay chamber to act on the upper or pressure side of a relay piston 34 reciprocably operable in the lower portion of casing 1. A second operating piston 35 is telescopically arranged within relay piston 34. A spring 36 compressedly disposed between a lower casing separating wall 37 and the underside of second operating piston 35 urges both pistons 34 and 35, as a unit, toward a normal uppermost position in which the upper side of relay piston 34 abuttingly engages a central separating casing wall 38.

Relay piston 34 is provided with a central bore 39 through which a lower, reduced diameter portion 40 of valve member 10 is sealingly coaxially slidable.

The second brake circuit control valve portion 3 further comprises a second inlet or supply chamber 42 and a second outlet or delivery chamber 43 connecting directly to second inlet 5 and second outlet 7, respectively. Communication between inlet 5 and outlet 7, and therefore between chambers 42 and 43, is controlled by a second supply-exhaust valve member 44 disposed and acting similarly to supply-exhaust valve member 10, said second supply-exhaust valve member also being provided with concentrically arranged outer supply and inner exhaust annular valve ribs 45 and 46, respectively. Supply valve rib 45 cooperates with an annular valve seat 47 formed on lower separating wall 37 in similar fashion as the cooperative action between supply valve rib 12 and valve seat 14 in the first brake circuit control valve portion 2. Also, similarly to the cooperative action between exhaust valve 13 and valve-operating member 23, inner exhaust valve rib 46 cooperates with a valve-operating member 48 associated and movable with second operating piston 35.

A spring 49 disposed, relative to second supply-exhaust valve member 44, similarly to spring 15 relative to first supply-exhaust valve member 10, also operates similarly thereto for urging said supply-exhaust valve member upwardly to a normal position in which supply valve rib 45 is seated on valve seat 47 for cutting off communication between second inlet 5 and second outlet 7, said second supply-exhaust valve member being axially reciprocably operable in a coaxial bore 50 formed in a closure cap 51 removably secured in the lower end of casing 1, as viewed in the drawing. Sufficient downward movement of second operating piston 35, and therefore of valve-operating member 48, causes said valve-operating member to sealingly engage exhaust valve rib 46 for cutting off exhaust of second delivery chamber 43, and thereafter cause supply valve rib 45 or second supply-exhaust valve member 44 to be unseated from valve seat 47. Whereupon fluid pressure may flow past the open second supply valve rib 45 from second supply chamber 42 to second delivery chamber 43, thence to the second brake circuit via second outlet 7.

Second operating piston 35 is screw-threadedly adjustably carried at the lower end of a sleeve member 52 disposed coaxially in the valve device, the upper or opposite end of said sleeve member making abutting contact with spring seat 29 resting thereon. An adjusting rod 53 extends coaxially through sleeve member 52 with the upper end thereof terminating beyond spring seat 29 in axially spaced-apart relation from the enlarged head 25 of bolt 19. The lower end of rod 53 rests on the adjacent end of an axially aligned adjusting bolt 54 screw-threadedly secured in closure cap 51. The axial position of adjusting rod 53 may be adjusted by adjusting the axial position of bolt 54 in cap 51.

Adjusting rod 53 may also be used for adjusting the axial position of second operating piston 35 relative to sleeve 52 by completely removing adjusting bolt 54 from cap 51, then rotating said adjusting rod with a screw driver applied to the slotted lower end thereof. A pin 55 couples rod 53 to sleeve 52 for rotating the two in unison, while piston 35, which is restrained from rotating due to sufficient frictional resistance provided by several sealing rings 56 secured in the respective peripheries of both operating piston 35 and relay piston 34. A longitudinal slot 57 formed in sleeve 52 allows rod 53 to be adjusted axially, as above described. Without affecting the axial position of sleeve 52.

A flexible one-way valve member 58 is mounted in closure cap 51 to permit exhaust of fluid pressure to atmosphere while preventing entry of foreign objects into the valve device. During brake release operation, that is, with first and/or second exhaust valve ribs 12 and 45 in their respective unseated positions, pressure from the first and/or second brake circuits is released reversely through outlets 6 and 7, outlet chambers 9 and 43, along the radial space surrounding sleeve 52 and the lower end of rod 53, then through valve member 58.

In operation, the operator causes a downwardly directed force, as viewed in FIG. 1, to be applied by a foot pedal (not shown) on pressure cap 17 whereupon such pressure causes said pressure cap to slide downwardly on the hub of spring seat 18 to cause pads 20, which possess a preselected compressibility rate, to be compressed an amount indicated A in the drawing and defined by abutting engagement of said pressure cap with a shoulder 59 formed on said hub of said spring seat, the limit of such compression being at the point of said abutting engagement and indicated as LR in FIG. 1. With pads 20 compressed to the limit LR, comtinued pressure acting thereon is transferred through spring seat 19 to springs 22 which are prestressed so as to begin to yield at the degree of pressure at which pads 20 reach the limit LR.

As the springs 22 yield, operating piston 21, along with valve-operating member 23, sleeve 52 (by action of spring 28), operating piston 35 (secured to said sleeve), and valve-operating member 48 are all moved downwardly by the force applied thereto by the foot pedal. As above noted, exhaust valves 13 and 46 of supply-exhaust valve members 10 and 44 are simultaneously closed, and then supply valves 12 and 45, respectively, are opened to effect supply of operating fluid pressure from inlets 4 and 5 to outlets 6 and 7 via supply chambers 8 and 42 and delivery chambers 9 and 43, respectively.

Figure 2:
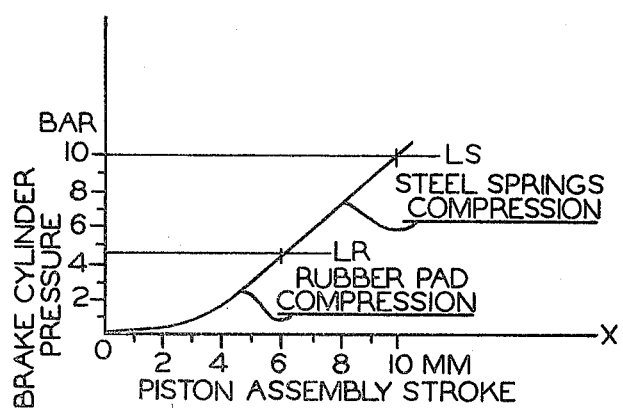
FIG. 2 is a graphic representation of the operational function of the control valve device shown in FIG. 1.

The compressibility characteristics of both the rubber pads 20 and the steel springs 22 are expressed graphically in FIG. 2, it being noted that the rate of compressibility of said pads is non-linear whereas the rate for said springs is linear. The limit point at which compression of rubber pads 20 terminates and that of springs 22 commences is indicated as LR on the graph. The point or amount of compression of springs 22 at which simultaneous closing of exhaust valves 13 and 46 and opening of supply valves 12 and 45 occurs is indicated as LS in the graph. The X axis of the graph shown in FIG. 2 represents the amount of axial movement, expressed in millimeters, of the several components comprising pistons 21 and 35, and valve operating members 10 and 44, whereas the Y axis represents the degree of operating pressure, expressed in bars, as supplied to the brake circuits and as related to said amount of axial movement, it being understood that the figures or values shown are by way of example only because rubber pads and springs of different compression ratings would produce different results.

With supply valves 12 and 45 now open fluid pressure builds up in both delivery chambers 9 and 43, such pressure build-up in chamber 9 acting on the lower surface of operating piston 21, along with the force of return spring 27, eventually causing upward movement of said operating piston to a lap position in which both supply and exhaust valves 12 and 13 are closed. Pressure build-up in chamber 9 also acts on the upper surface of relay piston 34 which is thereby moved downwardly into abutting engagement with operating piston 35. Pressure build-up in chamber 43 acts on the under side of operating piston 35 and builds up to a point at which, along with the force of spring 36, the force of such build-up balances the pressure force acting on the upper side of relay piston 34, and, in conventional manner causes the relay-operating piston assembly to assume a lap position in which both supply and exhaust valves 45 and 46 are closed.

In the manner hereinbefore described, the axial position of operating piston 35 on sleeve 52 is adjustable by rotation of adjusting rod 53. Such axial adjustment, as should be evident, changes the axial distance, indicated B in FIG. 1 of the drawing, between valve operating member 48 and exhaust-valve member 44. Thus, if distance B is shortened, exhaust-valve member 44, when a brake application is initiated, would be operated slightly ahead of exhaust-valve member 10, if such action is desired. This is made possible by the lost motion provided between spring seat 29 and shoulder 31. Moreover, shortening of distance B would also place spring 36 under greater compression and would therefore require, along with the correspondingly increased force exerted thereby, a correspondingly lesser pressure acting on the lower surface of operating piston 35 to balance the force of pressure acting on the upper side of relay piston 34. It should be apparent that opposite effect would result if distance B were lengthened. Thus, by adjusting the axial position of operating piston 35 relative to sleeve 52, the desired relative braking action between the two brake circuits may be obtained.

Normally, downward movement of pressure cap 17, when subjected to foot pedal pressure, is limited by abutment of said pressure cap with the upper limits, as viewed in FIG. 1, of casing 1. The amount of such downward movement, and consequently the degree of foot pedal pressure, can be further limited by axially adjusting rod 53 upwardly by screw 54 so that the upper end of said rod is abuttingly contacted by head 25 of bolt 19 before pressure cap 17 contacts casing 1.

I claim:

1. A brake control valve device for controlling supply of actuating fluid pressure to and release thereof from respective first and second brake circuits of a fluid pressure operable brake system, said control valve device comprising:
    a. first valve means having one position in which a first fluid pressure supply communication to the first brake circuit is closed and a first fluid pressure release communication therefrom is open;
    b. manually operable means for exerting an actuating force on and causing movement of said first valve means from said one position to a second position in which said first fluid pressure release communication is closed and said first fluid pressure supply communication is opened;

c. second valve means having one position in which a second fluid pressure supply communication to the second brake circuit is closed and a second fluid pressure release communication therefrom is open;

d. connecting means connected to and movable with said manually operable means and carrying coaxially thereon an operating member normally disposed in an axially spaced-apart position relative to said second valve means, said operating member being movable, by movement of said connecting means, to an abutting position relative to said second valve means for transmitting said actuating force thereto and causing movement of said second valve means from its said one position to a second position in which said second fluid pressure release communication is closed and said second fluid pressure supply communication is opened;

e. first fluid pressure responsive means operable responsively to fluid pressure in said first supply communication for exerting an opposing force on said manually operable means in opposition to said actuating force for effecting operation of said first valve means to a lap position in which both said first supply and release communications are closed upon equalization of the opposing forces acting on said manually operable means; and f. second fluid pressure responsive means threadably carried by a portion of said connecting means in abutting relation with said operating member and movable in unison therewith, said second fluid pressure responsive means being operable responsively to fluid pressure in said second supply communication for exerting an opposing force on said connecting means in opposition to said actuating force for effecting operation of said second valve means to a lap position in which both said second supply and release communications are closed upon equalization of the opposing forces acting on said operating member;

g. said second fluid pressure responsive means being axially adjustable on said connecting means for varying the spaced-apart position of said operating member relative to said second valve means and accordingly causing operation of said second valve means, relative to said first valve means, to occur in advance of, concurrently with or in arrears of said first valve means.

2. A break control valve device, as set forth in claim 1, further characterized by a lost-motion connection connecting said manually operable means with said connecting means.

3. A break control valve device, as set forth in claim 1, further characterized by:

a. spring means interposed between said manually operable means and said first valve means and being compressibly displaceable by operation of the manually operable means for generating said actuating force acting on said first valve means; and b. stop means for limiting movement of said manually operable means and, therefore, the compressible displacement of said spring means and the actuating force generated thereby.

4. A brake control valve device, as set forth in claim 3, wherein said second fluid pressure responsive means is screw-threadedly mounted on the connecting means, and further characterized by an adjusting rod coupled with said connecting means and rotatable for effecting corresponding rotation of the connecting means and consequent uniform axial adjustment of the second fluid pressure responsive means and the operating member relative to the connecting means.

5. A brake control valve device, as set forth in claim 4, wherein said stop means comprises said adjusting rod one end of which normally occupies an axially spaced-apart position relative to said manually operable means and is abuttingly engageable by the manually operable means for limiting said movement thereof, and means for adjusting said spaced-apart position, independently of said axial adjustment of the second fluid pressure responsive means and operating member relative to the connecting means.

* * * * *